United States Patent [19]

Scholz

[11] 4,195,781
[45] Apr. 1, 1980

[54] SELF-PROPELLED IRRIGATION APPARATUS

[75] Inventor: David C. Scholz, Roseville, Minn.

[73] Assignee: Moulton Irrigation Company, Somerset, Wis.

[21] Appl. No.: 935,172

[22] Filed: Aug. 21, 1978

[51] Int. Cl.² .......................... A01G 25/09; B05B 3/02
[52] U.S. Cl. ..................................... 239/177; 137/344
[58] Field of Search ................ 137/344; 239/177, 212

[56] References Cited

U.S. PATENT DOCUMENTS

| | | | |
|---|---|---|---|
| 3,001,721 | 9/1961 | Zybach | 239/177 |
| 3,704,827 | 12/1972 | Moulton | 239/177 |
| 3,843,058 | 10/1974 | Koinzan | 239/177 |
| 4,073,309 | 2/1978 | Fraser et al. | 239/177 X |
| 4,155,679 | 5/1979 | Cornelius et al. | 239/177 X |

*Primary Examiner*—Andres Kashnikow
*Attorney, Agent, or Firm*—Dorsey, Windhorst, Hannaford, Whitney & Halladay

[57] ABSTRACT

A self-propelled irrigation apparatus has a main pressurized irrigation liquid distribution pipe with its inner end pivotally supported at a central supply pipe and a plurality of radially extending distribution pipe sections which have swinging connections with each other, a mobile support at the outer end of a section, a liquid reaction spray motor for driving each mobile support, a diaphragm-operated "on-off" motor control valve connecting the motor to the distribution pipe, and a pilot valve selectively connecting a pressure control chamber at one side of the control valve diaphragm with either the pressurized irrigation liquid in the pipe or with a pressure relief opening in response to predetermined relative swinging movement of the pipe sections. The apparatus also has one or more controllable irrigation sprinkler units connected to the distribution pipe by a separate diaphragm operated "on-off" sprinkler control valve at a location spaced from the reaction motor, and the sprinkler control valve has a similar pressure control chamber connected to the same pilot valve for simultaneous "on" or "off" control of the reaction motor and sprinkler unit.

12 Claims, 12 Drawing Figures

Fig.12

SELF-PROPELLED IRRIGATION APPARATUS

FIELD OF THE INVENTION

The invention relates to improved self-propelled irrigation apparatus of the type in which a distribution pipe for irrigation liquid is pivotally supported at a central water supply source and has a plurality of radially-extending sections with mobile supports at one end and swingable portions or connections between adjacent sections to accommodate different rates of movement of their respective mobile supports.

BACKGROUND OF THE INVENTION

A number of patents have been issued which disclose self-propelled irrigation devices of the general type described in the preceding paragraph. For example, U.S. Pat. No. 2,604,359 recognizes the problem of maintaining all portions of a distribution pipe in a relatively straight radial line and discloses a piston and cylinder type of drive means for each mobile support, and a special tension cable control device at each intermediate support for controlling its drive means in accordance with the springing or bending of the distribution pipe portion at each side of the support.

U.S. Pat. No. 3,704,827 discloses an improved irrigation apparatus of this general type, in which an elongated water distribution pipe is supported by wheeled supports driven by power derived from the rotation of a sprinkler head at each support. The patent discloses means for increasing or decreasing the speed of each sprinkler head in response to relative swinging or bending movement of adjacent irrigation pipe portions to keep the pipe straight.

SUMMARY OF THE INVENTION

The present invention provides an improved self-propelled irrigation apparatus in which an elongated liquid distribution pipe is pivotally connected at one end with respect to a central liquid supply pipe and has a plurality of individual radial sections extending outwardly from the supply pipe with a mobile support for each such section, a liquid reaction sprinkler serving as a motor operatively connected to a traction wheel for moving each support and a control device for controlling such a liquid reaction motor in response to relative swinging movement of adjacent sections or portions of the distribution pipe. The improved control device of this apparatus includes the combination of a diaphragm-operated "on-off" control valve connected between the liquid reaction spray unit and the distribution pipe for supplying irrigation liquid to operate the liquid reaction unit and move the support and pipe around the central supply pipe, the control valve having a movable control diaphragm with a control pressure chamber adjacent thereto, in combination with a pilot valve having a selective fluid connection between the control pressure chamber and the irrigation liquid in the distribution pipe, in further combination with means responsive to relative swinging movement of the adjacent distribution pipe sections when the support advances relatively faster than another support, for actuating the pilot valve and shutting off the control valve and liquid reaction spray motor until the slower support comes into desired alignment.

According to a further feature of the invention, the apparatus has a second controllable sprinkler nozzle or unit on the distribution pipe at a location spaced along the pipe from the support and liquid reaction spray motor, with a separate similar diaphragm-operated sprinkler control valve connecting such controllable sprinkler nozzle to the distribution pipe, and with the pilot valve of the liquid reaction spray motor having an inlet fluid connection to the distribution pipe and an outlet fluid connection to the pressure control chambers of both the liquid reaction motor control valve and the spaced sprinkler control valve for shutting off the controllable sprinkler nozzle when the liquid reaction motor is shut off. The use and common control of such a controllable sprinkler and such a liquid reaction motor helps to provide more even water patterns over the irrigated area, despite any intermittent stopping of the various individual mobile supports.

The foregoing features can also be combined according to the invention with a plurality of main irrigation sprinkler nozzles spaced equally along the distribution pipe and connected thereto for continuous operation whenever pressurized liquid is fed to the pipe. Preferably, the successive radial distribution pipe sections have equal lengths and each has its mobile support and liquid reaction motor spray at the outer end of the section, its controllable irrigation sprinkler nozzle at the midpoint of the section, and two main sprinkler nozzles, one of which is substantially at the one-quarter point halfway between the inner end of the section and the controllable sprinkler nozzle, and the other of which is substantially at the three-quarter point halfway between the reaction motor spray nozzle and the controllable irrigation spray nozzle.

The improved pilot valve and diaphragm control valve combination of this invention also contributes to greater precision and sensitivity of control of the individual mobile supports and better alignment throughout the length of the distribution pipe.

Other features, details of construction and advantages of the present invention will be apparent from the following detailed description of a preferred embodiment.

BRIEF DESCRIPTION OF THE DRAWINGS

In the drawings which form a part of this application and in which like reference numerals indicate like parts.

DESCRIPTION OF THE PREFERRED EMBODIMENT

Figures 1, 2:
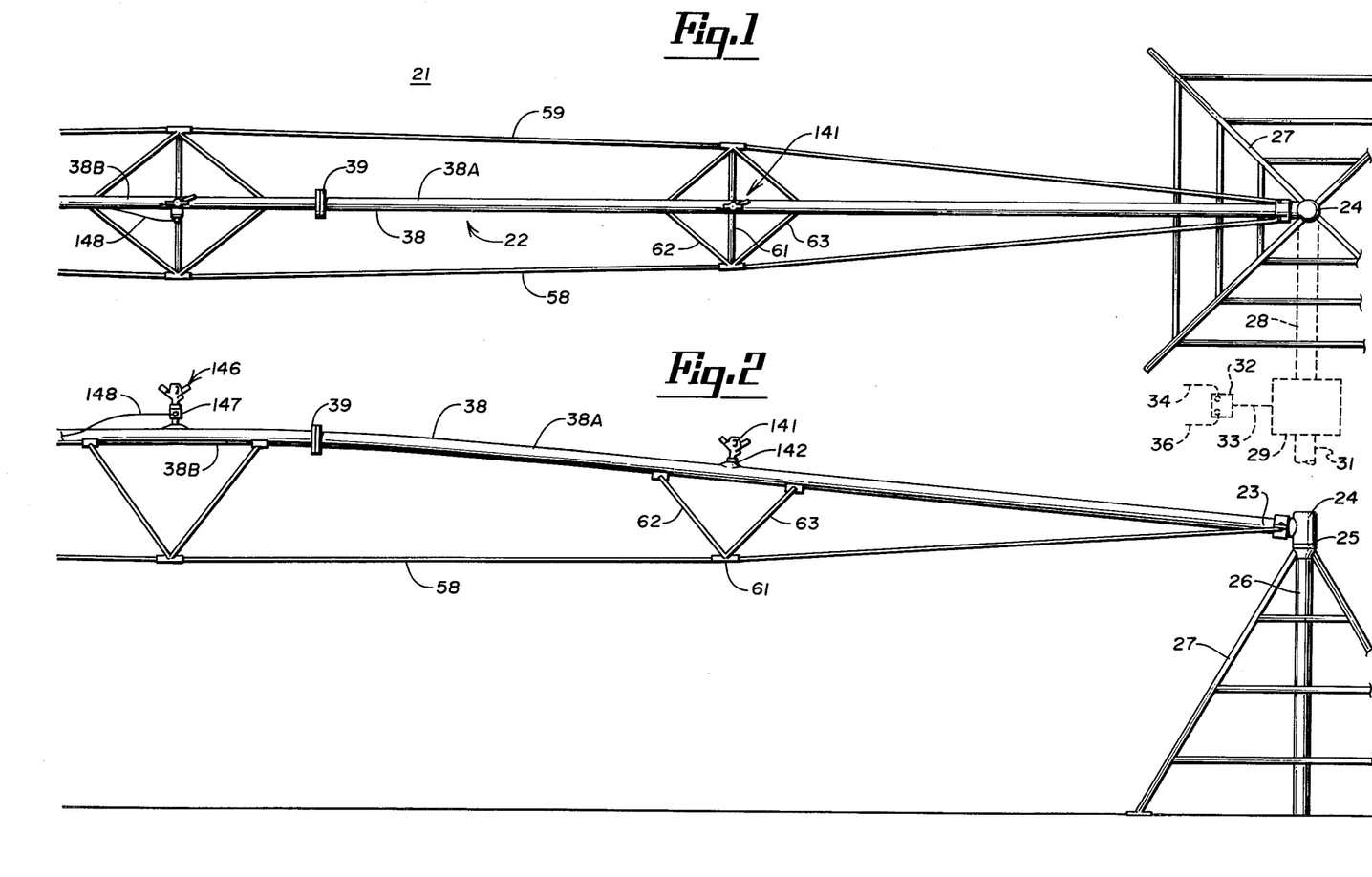
FIG. 1 is a partial plan view showing the inner pivoted end of a center-pivot irrigation apparatus according to the present invention.
FIG. 2 is a side elevation of the portion of the apparatus shown in FIG. 1.

The irrigation apparatus 21 includes an elongated irrigation liquid distribution pipe 22 having an inner end 23 connected to an inlet or supply head 24 pivotally mounted at 25 on a vertical central liquid supply pipe 26, as shown in FIGS. 1 and 2. Supply pipe 26 is supported at a predetermined fixed location by a frame 27 and is supplied with irrigation liquid through a suitable inlet pipe 28, which may be located below the ground level and connected through a pressure pump and control valve shown schematically at 29 to a main liquid supply connection 31. The flow of pressurized irrigation fluid through pipe 28 to pipe 26 is controlled in known manner by an electrical control switch 32 operatively connected at 33 to the unit 29. Leads 34 and 36 extend from switch 32 and a suitable pivotal connection (not shown), so that such leads can extend along the sections of the irrigation apparatus to a position responsive safety or control switch to be described.

The liquid distribution pipe 22 includes a plurality of individual radial sections which extend outwardly from the central supply pipe and which have swinging connections to each other for limited swinging movement around at least a generally vertical axis at each such connection. Thus the pipe section 38 extends from the center pivot head 24 to a first mobile support 46, at which the first section has a swinging connection 42 with the inner end 43 of the next outward section 44 of the distribution pipe 22.

The mobile support 46 includes a lower frame member 47 with supporting wheels 48 and 49 at its ends. Frame portion 47 is connected by struts 51, 51A, 52 and 52A to the outer end 41 of the first distribution pipe section 38. As shown, this first section 38 may include a plurality of individual pipe units 38A, 38B and 38C, connected rigidly in alignment with each other by flange connections 39.

Figures 5, 6, 7:
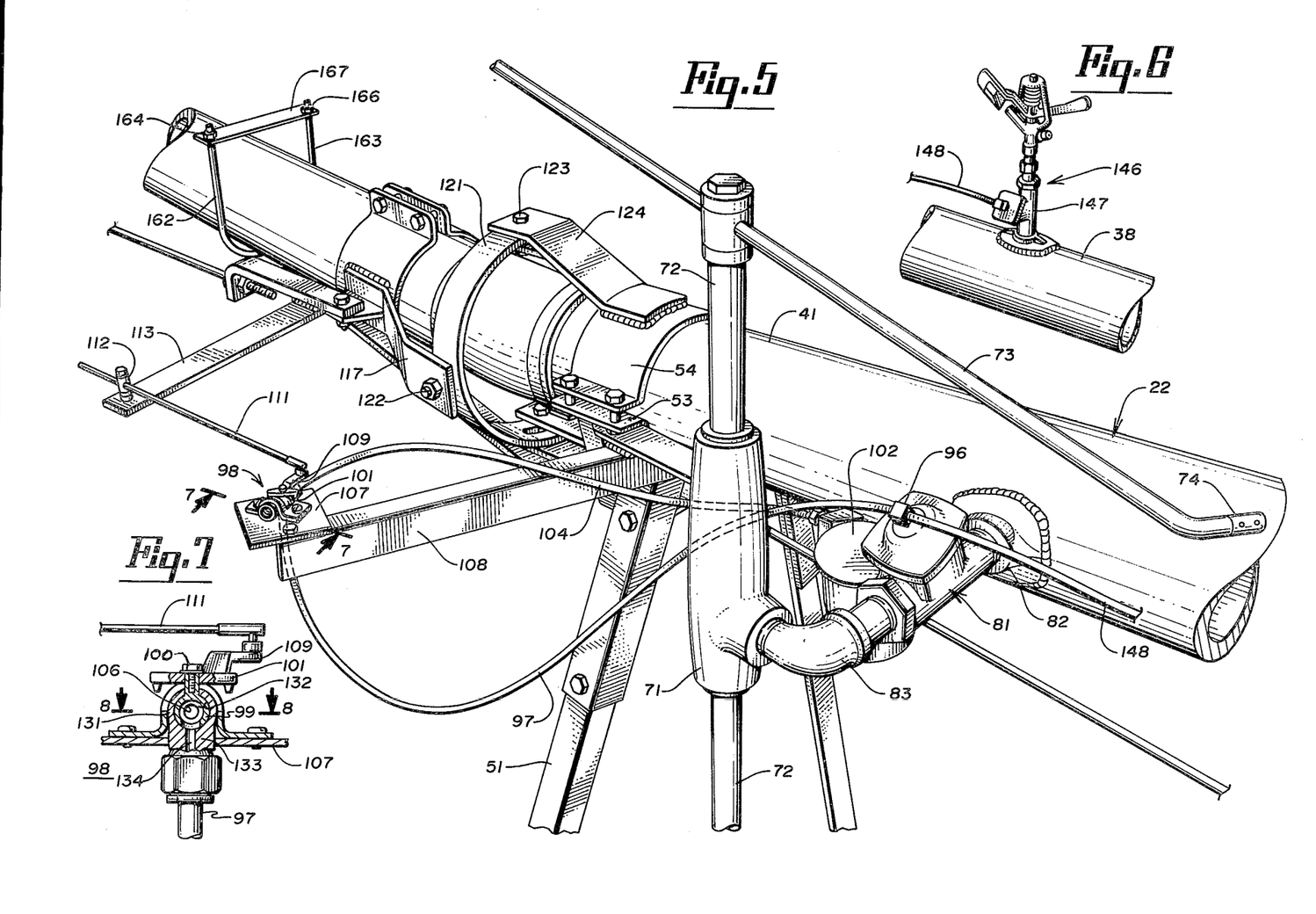
FIG. 5 is a partial perspective view of the swinging connection between two sections of the main irrigation liquid distribution pipe, including details of the driving and control mechanisms at the mobile supporting tower for that portion of the apparatus.
FIG. 6 is a partial perspective view of a controllable irrigation sprinkler unit mounted at an intermediate location on the distribution pipe of the apparatus.
FIG. 7 is a partial sectional view on the line 7—7 of FIG. 5.
Figure 8:
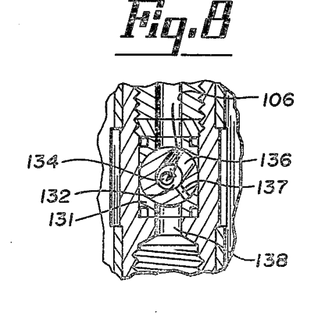
FIG. 8 is a partial sectional view of the pilot valve which is part of the control mechanism of the apparatus, taken on the line 8—8 of FIG. 7.

Supporting struts 51, 51A of the mobile support 46 are rigidly connected at their upper ends to the outer end 41 of the first distribution pipe section, by means of a suitable frame portion and lower and upper clamping members 53 and 54 (FIG. 5). The frame members 52 and 52A of support 46 are also rigidly connected at 56 (FIG. 4) to the outer portion of the first distribution pipe section.

To support and maintain the proper alignment of the entire first section of distribution pipe, an under-truss arrangement is shown in which the pipe section 38 is arched upwardly between the inner end 23 and outer end 41, and supported in such configuration by appropriate longitudinal stays 58 and 59, which are tensioned longitudinally between the ends of the section to maintain the arched configuration, and which are connected at intermediate points to the distribution pipe by frame members which include crossbars 61 to maintain a horizontal spacing between the stays 58 and 59 and by diagonally and upwardly extending frame portions 62 and 63. These frame portions are illustrated at three intermediate points along each section, i.e., one-quarter, one-half and three-quarters of the distance along the section from its inner end to its outer end.

Figure 3:
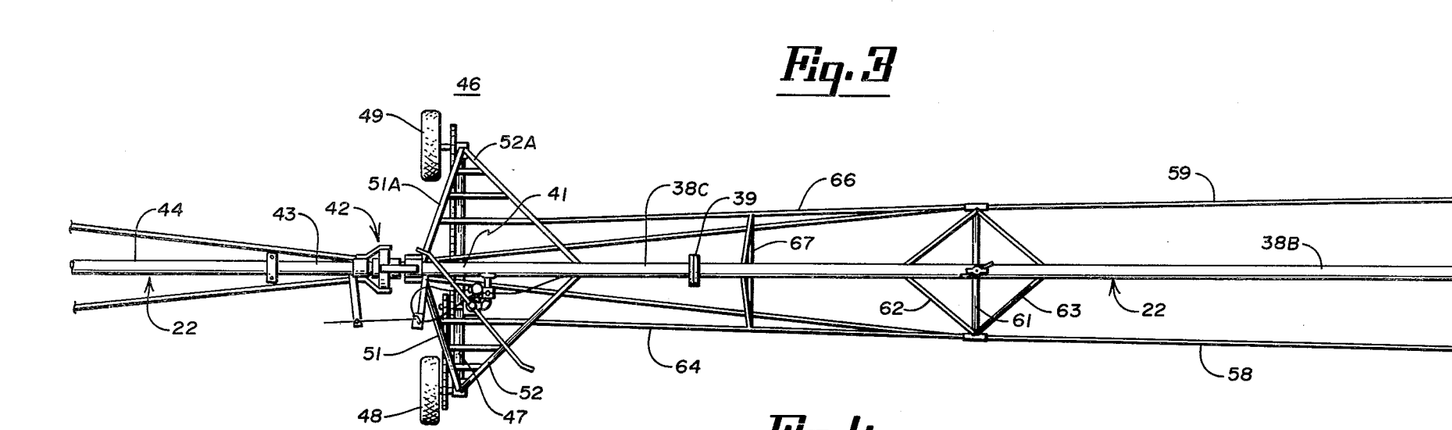
FIG. 3 is a view similar to and supplementing FIG. 1, showing the remaining portion of the first or inner section of the irrigation apparatus partly shown in FIG. 1.
Figure 4:
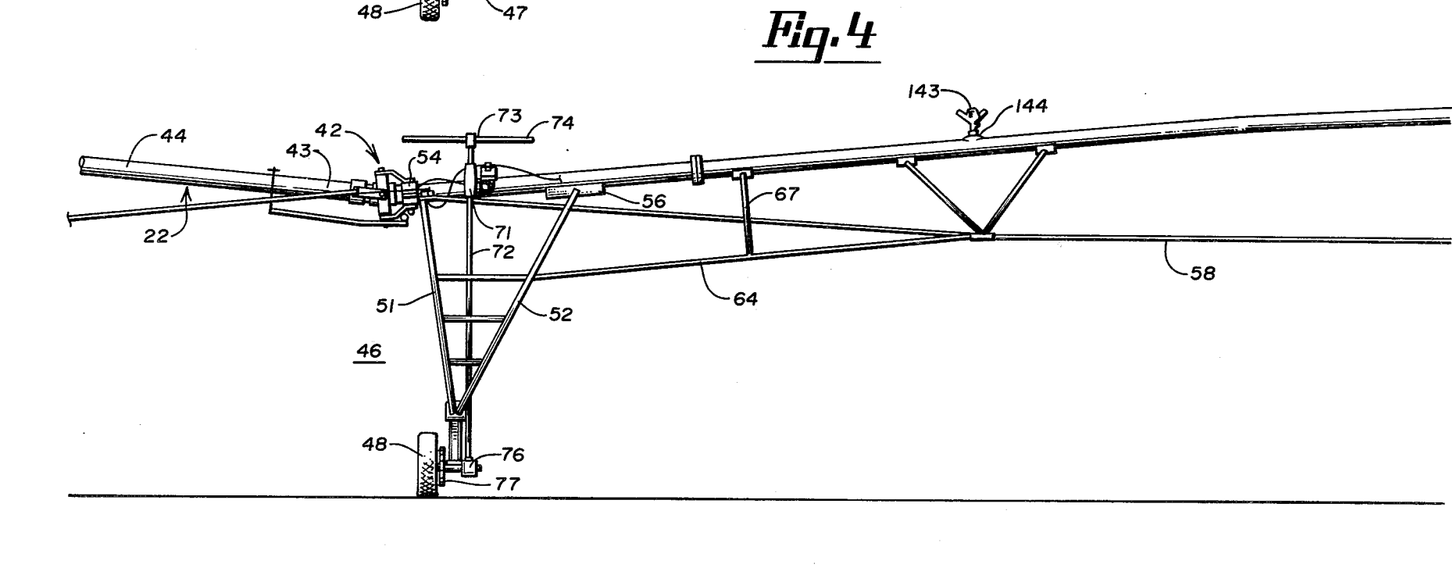
FIG. 4 is a view similar to and supplementing FIG. 2 and is a side elevation of the portion of the apparatus shown in FIG. 3.

At the outer end, additional stays or connecting rods 64 and 66 extend from the mobile support 46 to the nearest frame section 61, 62, 63, and may be further connected at each other and to the distribution pipe by an intermediate frame 67 (FIG. 3). This arrangement of supporting trusses and frames effectively maintains the distribution pipe in a straight line throughout the length of each individual section, i.e., between the respective supports at each end of the section. Between each inner section and the next outer section, however, the apparatus has the swinging connections 42 which take care of possible differences in the relative rates of movement of the individual supporting members 46 around the central supply pipe 26.

Each mobile support 46 includes a liquid reaction motor drive mechanism connected to at least one of the supporting wheels 48 and 49. A preferred form of such mechanism is shown in U.S. Pat. No. 3,704,827 and includes a motor housing 71 through which a vertical power shaft 72 extends from an upper rotary spray head 73 with driving reaction nozzles 74 to a lower gearbox 76 at which shaft 72 drives a cross-shaft and is connected by appropriate chain drives 77 and 78 (FIG. 12) to each of the supporting and traction wheels 48 and 49.

Figure 12:
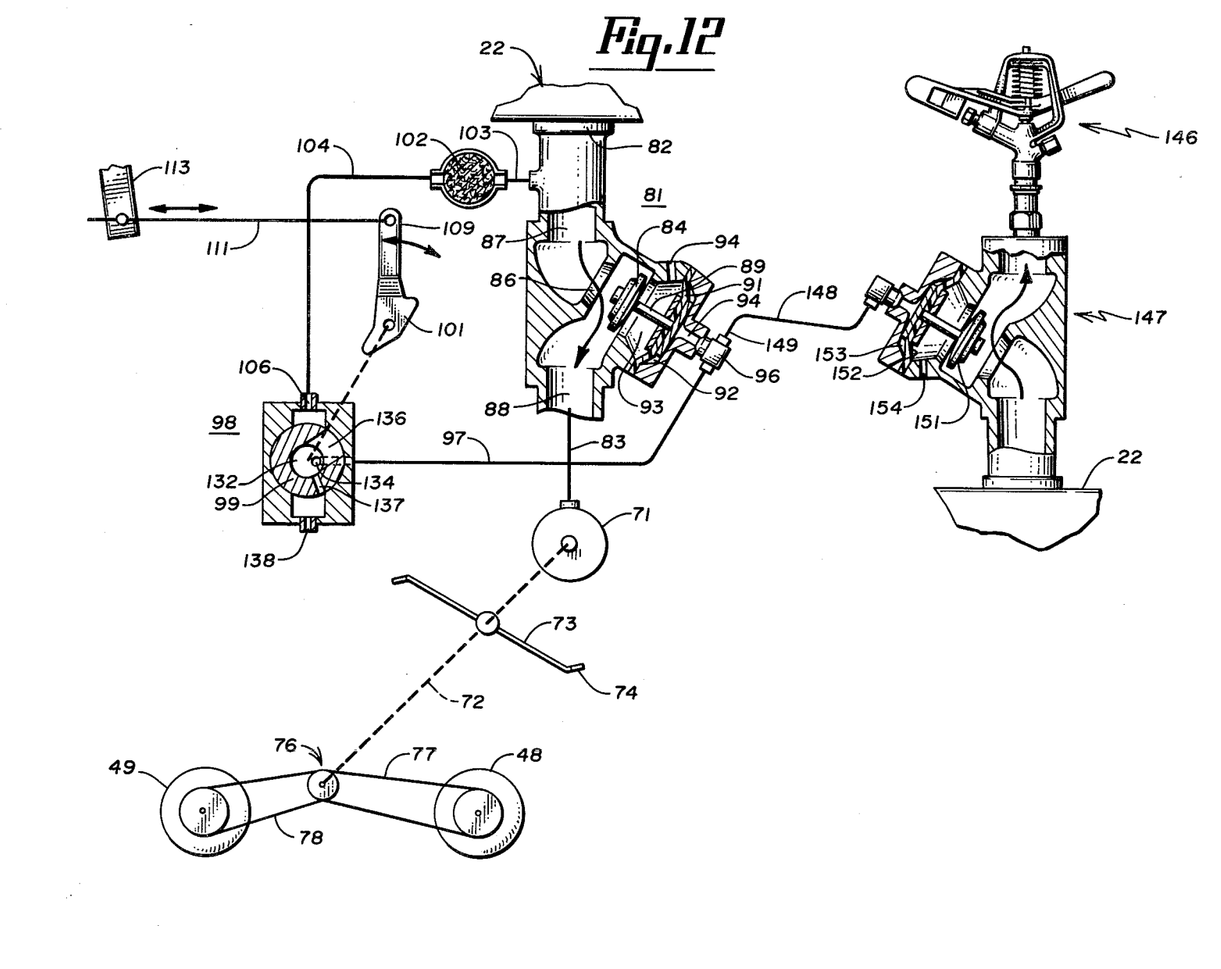
FIG. 12 is a partial schematic view showing details of the control and driving mechanisms for the apparatus.

To control the flow of pressurized irrigation fluid from the distribution pipe 22 to the housing 71 of the liquid reaction motor and its reaction nozzles 74, the invention provides a diaphragm-operated on-off motor control valve 81 shown in detail in FIG. 12. Valve 81 has its inlet end connected at 82 to the main distribution pipe 22. The outlet from such valve 81 is connected by piping 83 to the reaction motor housing 71, from which the liquid passes under pressure up through the upper portion of shaft 72 to the rotary spray members 73 with their reaction nozzles 74.

Valve 81 includes a movable valve member 84 which cooperates with a valve seat 86 to open or close the passageway between the valve inlet chamber 87 and its outlet chamber 88. Valve 84 is supported through a shaft portion 89 by a flexible diaphragm member 91 within the valve housing. The housing provides a pressure or control chamber 92 at the outer surface of the diaphragm 91 and an inner chamber 93 which is connected to atmospheric pressure through a vent 94. Thus, when no pressure is applied in control chamber 92, the pressurized fluid in the inlet chamber 87 can push the valve member 84 and its associated diaphragm 91 outwardly to the running position shown in FIG. 12. In this position there will be a steady flow of pressurized liquid to the reaction motor, and the supporting tower 46 will accordingly be moved in the desired circumferential direction around the central supply pipe 26.

Pressure can be applied to control chamber 92 of the diaphragm valve through an inlet 94 to which a fitting 96 is connected. A flexible conduit 97 connects fitting 96 to a pilot control valve 98, which functions in combination with the diaphragm-operated motor control valve to shut off the liquid reaction motor 71 and stop the movement of a particular support 46, whenever the particular support gets too far ahead of the desired alignment with the remaining inner and outer sections of the distribution pipe 22. Further details of the pilot valve are shown in FIGS. 5, 7 to 9, and 12. The valve includes a rotary inner ball valve portion 99 which is rotatable on a substantially vertical axis by an upper control member 101 secured to rotate with the valve ball 99. Pressurized liquid is supplied to the pilot valve from a filter 102 (FIG. 12) connected at 103 to the inlet pipe for the motor control valve 81. The liquid is filtered to remove particles which might be large enough to block or jam the pilot valve parts. A conduit 104 carries the filtered fluid from 102 to an inlet opening 106 in the pilot valve housing. The pilot valve is mounted on a supporting plate 107 carried at the end of a transverse frame member 108. The valve control member 101 has a projecting arm 109 pivotally connected to a control rod 111, the other end of which is adjustably connected at 112 to the outer end of a bracket 113 connected to the inner end of the next distribution pipe section through appropriate clamping members 114 and 116. Thus bracket 113 is essentially rigidly connected to the inner end 43 of the outer pipe section 44, while bracket 108 is essentially rigidly connected to the outer end 41 of the inner pipe section 38.

The swinging connection 42 between these sections includes horizontally spaced arms 117 and 118 connected to the bracket 116 on the outer section. These arms are pivotally connected at 122 for relative rotation on a horizontal axis with respect to a universal intermediate collar 121. Collar 121, in turn, includes vertical pivot connections 123, which are pivotally supported by upper and lower supporting arms 124 and 126 rigidly connected with respect to the outer end 41 of the inner pipe section 38 and the frame portions of its support 46. The inner and outer pipe sections are connected to each other by flexible sleeve 127, which maintains the connection between the two sections throughout any desired universal swinging movement permitted by the universal joint type of connection just described.

The rotary valve ball portion 99 is supported within the valve housing 131 secured to plate 107. The open central portion 132 of valve member 99 is connected by a vertical passage 133 in such member to the outlet opening 134 to which conduit 97 is connected for communication with the pressure chamber 92 of motor control valve 81. Thus the pressure control chamber 92 is connected at all times to the open central area of valve member 99, so that pressure can be applied to or released from the motor control valve chamber 92, depending on the particular rotary position of valve member 99. Thus the valve member has a normal transverse inlet passage 136, which can connect the central valve area 132 with the inlet opening 106 for pressurized fluid carried from filter 102 by conduit 104, when the parts are in the position of FIG. 8. In this position, pressure will be applied to the control valve 81 so as to close the valve and cut off the liquid reaction motor 71, in response to operation of the valve through the control connection 111 between the inner and outer sections of the distribution pipe 22.

Figure 9:
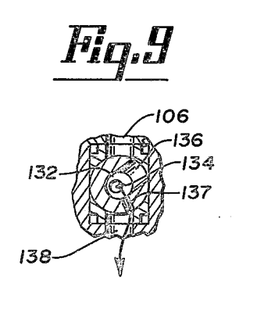
FIG. 9 is a partial sectional view similar to FIG. 8 showing the valve mechanism in an alternate position.

When the two pipe sections are within the desired limits of proper alignment, however, the linkage 111 will hold the valve member 99 in the running position shown in FIGS. 9 and 12, in which the main inlet passage 136 of the valve member is no longer in communication with the pressurized fluid inlet 106. In this running position, a specially provided and located bleed passage 137 in the rotary pilot valve member 99 is moved into communication with bleed port 138 in the pilot valve housing, so that the pressure in conduit 97 and the pressure chamber 92 of the motor control valve 81 can be relieved, and the valve 84 opened by the pressure of the irrigation liquid within the valve. Thus the liquid reaction motor 71 will again receive pressurized fluid and move the support 46 and its associated distribution pipe portions to maintain once again the desired alignment of the pipe.

The angular relationship between the cut-off edge of the inlet passage 136 in valve ball 99 and the bleed passage 137 therein can be selected within the desired critical limits, depending on the lateral spacing of the connecting link 111 from the vertical pivots 123 between the sections and also depending on the degree of angular misalignment which can be permitted at swinging connection 42 around the pivots 123, without damage to the equipment. The length of the lever arm 109 of the valve actuating member 101 in combination with the above mentioned lateral spacing of the link 111 from pivots 123 is a factor in accommodating the desired degree of angular swinging between the pipe sections to the particular angular spacing of the passages 136 and 137 in the valve member 99.

Pilot valve actuating member 101 is removably secured by nut 100 to an axially projecting shaft portion of the movable pilot valve member 99 and can be selectively mounted in either of two positions. In the position shown in FIG. 5, lever arm 109 extends transversely toward the distribution pipe to its point of connection with link 111. In its alternate position (not shown) the lever arm 109 extends 180° away from the position of FIG. 5 and thus extends transversely away from the distribution pipe, with link 111 again connected to the outer end of the lever arm. The selection of one position or the other depends on the transverse direction in which the liquid reaction motor is connected (e.g. at gear box 76) to drive the movable pipe support.

As shown in FIGS. 1 to 4, each section or unit of the apparatus includes at least one main irrigation sprinkler unit or nozzle. Such units are spaced along the distribution pipe and are designed to provide relatively uniform coverage of the circular area over which the irrigation apparatus passes as the sections move around the central supply pipe 26. Such main irrigation sprinklers are shown at 141 and are secured directly to the top of the distribution pipe at 142, so that these main sprinklers operate at all times when the irrigation liquid is fed under pressure to the distribution pipe. The main sprinklers can be adjusted in known manner so that the outermost main sprinklers discharge more liquid per unit of time than the innermost main sprinklers, in view of the greater distance to be covered by the outer sections of the apparatus. In the present case, the nozzles of each liquid reaction motor also provide a substantial amount of irrigation in the area over which the supports 47 pass. To provide a greater uniformity of the total irrigation pattern, the present apparatus also includes a controllable irrigation sprinkler nozzle or unit at the midpoint of each section, as well as two main sprinkler nozzles for each section. As shown, one of the main sprinkler nozzles 141 is located substantially at the one-quarter point, i.e. half way between the inner end of the section and the controllable sprinkler unit 146 which is at the center of the section. The other main sprinkler nozzle is located at the three-quarter point, half way between the reaction motor spray nozzle at the outer end of the section and the controllable irrigation spray nozzle at the center of the section. This pattern is repeated throughout the remaining outer sections of the irrigation apparatus, so that there will be an equal spacing of each of the main irrigation spray units from each other and either a reaction motor spray unit or a compensating spray unit between each pair of main spray nozzles. The compensating unit 146 is preferably of lower capacity than the main units 141, but all of these units involve irrigation sprays which are readily available commercially and which can be adjusted to the desired rates of flow and angular swing in accordance with the desired irrigation pattern. Such units, for example, can swing their nozzles through an angular path of three hundred sixty degrees and can be adjusted to supply anything from two or three gallons per minute to one hundred gallons per minute for each such spray unit.

To maintain the desired even pattern of irrigation, the intermediate or compensatory spray units 146 are not connected directly to the distribution pipe 22 so as to be operative at all times. Instead, each such unit 146 is connected to the distribution pipe 22 by a diaphragm-operated control valve 147 (FIGS. 2, 6 and 12).

The details of the diaphragm-operated control valve 147 are essentially similar to those of the motor control valve 81. Thus the valve includes a movable valve member 151 to control the flow of liquid from distribution pipe 22 to the irrigation unit 146. The position of the valve 151 is determined by the position of diaphragm 152, which in turn depends on the relative pressure differential between the pressure control chamber 153 and the fluid reaching the control valve from pipe 22. A bleed opening 154, like bleed opening 94 of control valve 81, facilitates the closing of the valve when pressure is applied to chamber 153.

The pressure control chamber of each such controllable irrigation sprinkler is connected to a conduit 148, which has its other end 149 connected to the pilot valve 98 through the T-connection 96 at the motor control valve 81. Thus pilot valve 98 will simultaneously control both the motor control valve 81 and the controllable sprinkler valve 147 to shut off the sprinkler 146 whenever the reaction motor is stopped, so that liquid is not being discharged from its rotary spray nozzles 73, 74.

The combination of the single pilot valve with the respective motor control valve and controllable spray valve thus permits the use of a compensatory spray to balance the irrigation effects provided by the liquid reaction motor and maintains a suitably balanced spray pattern by cutting off the compensatory irrigation spray when the liquid reaction motor is stopped.

Thus a plurality of liquid reaction motors and intermediate controllable irrigation sprinklers can be spaced along the distribution pipe with their relative spacing and respective volume rates of flow selected to provide a substantially even water pattern along the distribution pipe from the simultaneous action of all such units. Added to this water pattern is the irrigation liquid provided by the main irrigation sprinklers which are spaced along and connected to the distribution pipe for continuous operation whenever pressurized irrigation liquid is fed to that pipe. The respective spacings and volume rates of flow of the main sprinklers thus provide a pattern of additional irrigation liquid which combines with the water pattern from the reaction motors and controllable sprinklers to achieve a desired relatively uniform coverage of the total area over which the distribution pipe is moved.

Figure 10:
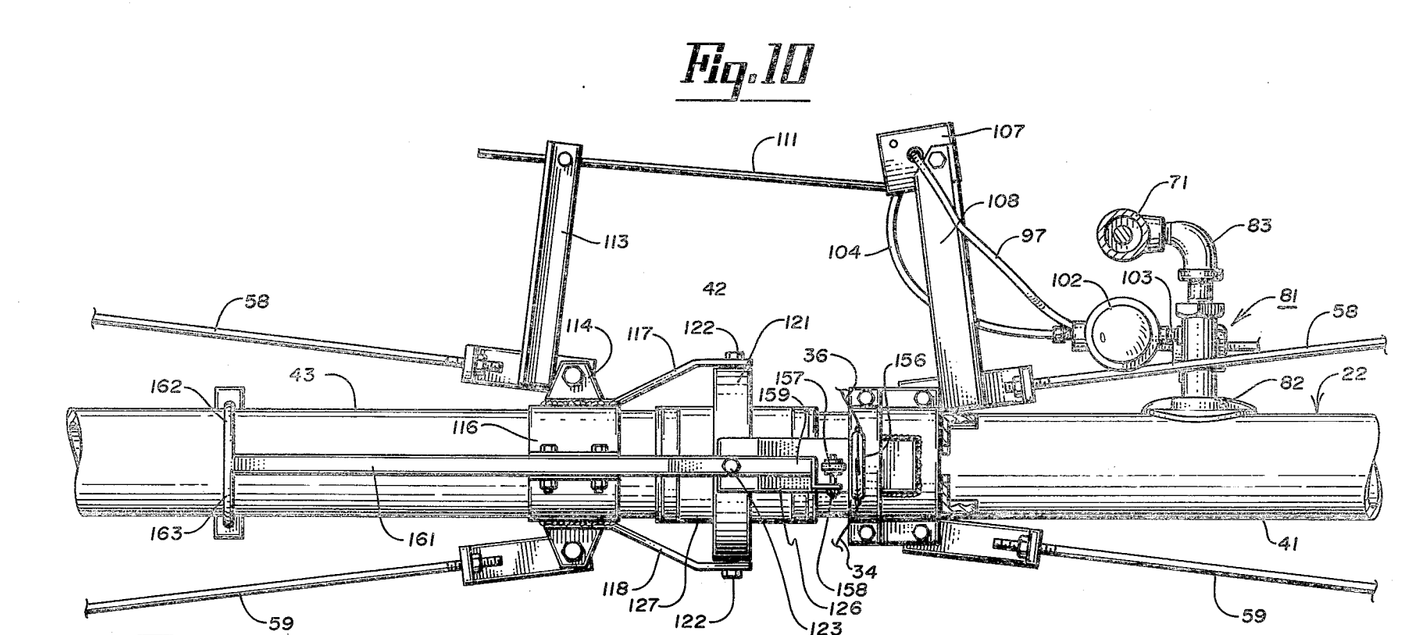
FIG. 10 is a partial bottom view of that portion of the apparatus shown in FIG. 5.
Figure 11:
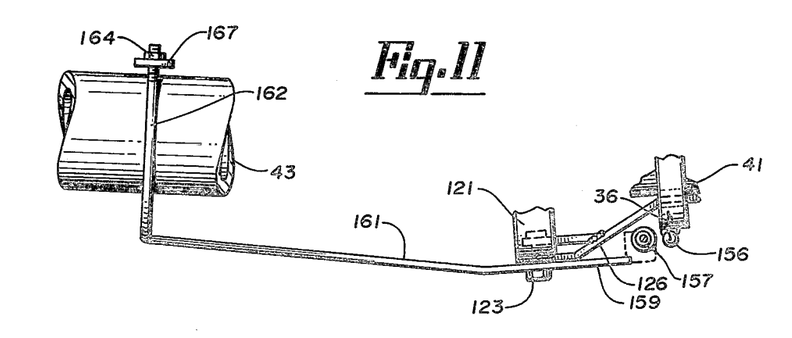
FIG. 11 is a partial side elevation showing details of a safety control mechanism.

A safety or master control switch 156 is provided in connection with each swinging connection 42 between the respective distribution pipe sections. As shown in FIG. 10, switch 156 is a reed switch, which can be actuated by the relative transverse position of a magnetic member 157 adjustably mounted at 158 on the inner end 159 of a longitudinally extending lever arm 161 pivoted beneath the swinging connection at the same vertical pivot 123 which provides relative transverse swinging movement of the sections around such vertical axis. The outer end of lever arm 161 carries a U-shaped member with upwardly projecting arms 162 and 163 which extend upwardly along each side of the inner end 43 of the next outer section 44. The upper ends of U-shaped arms 162 and 163 are connected respectively at 164 and 166 to an upper cross member 167 which extends laterally above the distribution pipe 22. The vertical distance between the bottom of the U-shaped sections 162, 163 and the upper cross member 167 is sufficiently greater than the diameter of the distribution pipe to permit relative vertical swinging movements between the inner and outer pipe sections around the horizontal pivots 122 of the universal swinging connection at 42. Thus substantial vertical relative swinging movement can take place in response to differences in terrain elevation at the supports for adjacent sections, without adversely affecting the other controlling mechanism already described.

By appropriate selection of the relative lengths of the lever arm portions 159 and 161 at opposite ends of pivot 123, and by selection of a reed switch 156 with appropriate operating characteristics depending on the desired extent of movement of the magnetic actuator portion 157, the safety control switch 156 can be maintained in one operating condition while the two corresponding pipe sections are within the desired maximum limits of transverse swinging movement. Any transverse swinging movement in excess of such limits, however, will change the operating condition of switch 156, which is connected by leads 34 and 36 to the control unit 32 schematically shown in FIG. 1, to completely cut off the supply of irrigation liquid to the distribution pipe.

The described invention accordingly provides an improved mobile irrigation apparatus in which liquid reaction motors provide both the motive power for traveling supports for swingably connected distribution pipe sections and selective irrigation of the areas over which such liquid reaction motors pass, in combination with precise "on-off" control of such motors by a diaphragm-operated motor control valve operating in combination with a pilot valve, each of which is entirely actuated by pressure of the irrigation fluid carried by the distribution pipe of the apparatus. The combination of the present invention also provides advantages in the simultaneous control of a plurality of diaphragm-operated valves to establish or discontinue selected spray pattern effects at a plurality of locations along the distribution pipe in response to the action of a single control mechanism pilot valve at one of the swinging connections between adjacent distribution pipe sections.

In a multiple section center pivot irrigation device incorporating features of the invention, the outermost mobile support is driven by the same type of liquid reaction motor shown herein and also described in U.S. Pat. No. 3,704,837. However, it is desirable to be able to set the speed of the outermost liquid reaction motor at any selected setting to establish the rate of movement of the entire distribution pipe around its central pivot. For that purpose a manually adjustable variable orifice valve of the general type shown in FIG. 8 of that patent can be included in the supply line from the distribution pipe to the outermost liquid reaction motor. Thus the inner motors, when operating, will run at a speed determined by the available irrigation liquid pressure, while the outermost motor will normally be set by its variable orifice valve to operate at a slower speed.

The foregoing specification sets forth certain preferred embodiments and modifications of the invention and some of the ways in which the invention may be put into practice, including the best mode presently contemplated for carrying out the invention. Modifications of the described apparatus, as well as alternate embodiments for carrying out the invention, may also be apparent to those skilled in the art, within the spirit and scope of the following claims:

I claim:

1. In a self-propelled irrigation apparatus having an elongated liquid distribution pipe pivotally connected to a central liquid supply pipe at one end, and having a plurality of individual radial sections which extend outwardly from the central supply pipe with swinging connections to each other for limited swinging movement around a generally vertical axis at each such connection and in which each section has a mobile support at one end with a ground-engaging traction wheel, a liquid reaction motor operatively connected to said traction wheel for moving said support, and a control device at each support except one for controlling the liquid reaction motor in response to the relative swinging movement of the adjacent sections of the distribution pipe, the improvement in which the control device comprises the combination of a diaphragm-operated on-off motor control valve connected between the liquid reaction motor and the distribution pipe for supplying irrigation liquid to operate the liquid reaction motor and move the support and pipe around the central supply pipe, said diaphragm-operated valve having a movable control diaphragm with a control pressure chamber adjacent thereto, and a pilot valve having a fluid connection between the control pressure chamber and the distribution pipe, and means responsive to relative movement of the adjacent pipe sections when the support advances relatively faster than other support for actuating the pilot valve and shutting off the motor control valve and liquid reaction motor until the slower support comes into desired alignment.

2. Irrigation apparatus according to claim 1 in which the pilot valve has an inlet, an outlet, a bleed opening and a movable pilot valve member selectively connecting the outlet only to the inlet in a first position of the pilot valve member and selectively connecting the outlet only to the bleed opening in a second position of the pilot valve member, the pilot valve having its outlet connected to the control valve pressure chamber, its inlet connected to the distribution pipe to receive liquid therefrom, and its bleed opening open to the surrounding atmosphere, and the means responsive to relative movement of the adjacent pipe connections is connected to the movable pilot valve member for selectively moving that member between its first and second positions.

3. Irrigation apparatus according to claim 2 in which the movable pilot valve member is a rotary member mounted for rotation on a predetermined axis, the pilot valve having a housing in which the outlet opening is located next to the movable valve member along its rotation axis, the housing also having the inlet opening and bleed opening angularly spaced around the movable valve member and its rotation axis, and the movable valve member having an axial opening communicating at all times with the outlet opening and angularly spaced passages extending radially from the axial opening for selective connection of the axial opening to the respective inlet and bleed openings in the pilot valve housing.

4. Irrigation apparatus according to claim 3 in which the movable pilot valve member has an axial shaft portion projecting from the housing, a radial lever arm removably connected to the shaft and valve member and extending generally transversely of the distribution pipe, and a link member extending longitudinally from the lever arm to a transverse bracket fixed to the adjacent distribution pipe section, for swinging the lever arm and pilot valve member between first and second positions in response to relative swinging movement between the distribution pipe sections.

5. Irrigation apparatus according to claim 4 in which the radial lever arm can be selectively connected to the movable pilot valve member in a position extending transversely toward the distribution pipe and a reverse 180° position extending transversely out away from the pipe depending on the transverse direction in which the liquid reaction motor is connected to drive the mobile support.

6. Irrigation apparatus according to claim 1 in which the liquid reaction motor includes a rotary driving spray nozzle positioned to irrigate an area adjacent its support while the reaction motor is driving the traction wheel and moving the support, the apparatus further having a controllable irrigation sprinkler nozzle on the distribution pipe at a location spaced along the pipe from the support and a separate diaphragm-operated sprinkler control valve connecting said controllable sprinkler nozzle to said pipe, the pilot valve of the liquid reaction motor having an inlet fluid connection to said pipe and an outlet fluid connection to both the motor control valve and sprinkler control valve for shutting off the controllable sprinkler nozzle when the liquid reaction motor is shut off.

7. Irrigation apparatus according to claim 6 having a plurality of main irrigation sprinkler nozzles spaced equally along the distribution pipe and connected thereto for continuous operation whenever pressurized liquid is fed to the pipe from the control supply pipe, the successive distribution pipe sections having equal lengths and each having its mobile support and liquid reaction motor nozzle at the outer end of the section, its controllable irrigation sprinkler nozzle at the midpoint of the section, and two main sprinkler nozzles, one of which is substantially at the one-quarter point halfway between the inner end of the section and the controllable sprinkler nozzle, and the other of which is substantially at the three-quarter point halfway between the reaction motor spray nozzle and the controllable irrigation spray nozzle.

8. Irrigation apparatus according to claim 6 having a plurality of liquid reaction motors and intermediate controllable irrigation sprinkler nozzles spaced along the distribution pipe with their relative spacing and respective volume rates of flow providing a substantially even water pattern along the distribution pipe from the simultaneous action of all such units.

9. Irrigation apparatus according to claim 8 also having a plurality of main irrigation sprinklers spaced along the distribution pipe and connected thereto for continuous operation whenever pressurized irrigation liquid is fed to the distribution pipe.

10. Irrigation apparatus according to claim 9 in which the respective volume rates of flow of the main sprinklers are progressively greater from the inner to the outer end of the distribution pipe and provide additional irrigation liquid which combines with the water pattern from the reaction motors and controllable sprinklers for a desired relatively uniform coverage of the total area over which the distribution pipe is moved.

11. In a mobile irrigation apparatus having a main irrigation liquid distribution pipe and a sprinkler unit mounted along the pipe, the improvement comprising a diaphragm-operated control valve having an inlet connected to the pipe, an outlet connected to the sprinkler unit, a movable control valve member for selectively opening and closing a valve passage between the inlet and outlet, a diaphragm connected to the valve member, and a pressure control chamber at one side of the diaphragm within the control valve, in combination with a pilot valve having an inlet, an outlet, a bleed orifice, and a movable pilot valve member having passages therein selectively connecting the outlet only to the inlet in a first position of the pilot valve member and selectively connecting the outlet only to the bleed orifice in a second position of the pilot valve member, the pilot valve being located at a position spaced from the diaphragm-operated control valve and having a conduit connecting its outlet to the control valve pressure chamber, its inlet connected to the distribution pipe to receive liquid therefrom, and its bleed orifice open to the surrounding atmosphere, and mechanical operating means responsive to relative swinging movement between selected portions of the distribution pipe for moving the pilot valve member between its first and second positions.

12. Irrigation apparatus according to claim 11 having a second sprinkler unit mounted at a location spaced along the pipe from the first-mentioned sprinkler unit, the second sprinkler unit having a separate control valve similar to the first-mentioned control valve connecting the second sprinkler unit to the pipe, and a conduit hydraulically connecting the pressure control chamber of the separate control valve for the second sprinkler unit to the outlet of the same pilot valve which controls the control valve of the first sprinkler unit.

* * * * *